United States Patent
Salou et al.

(10) Patent No.: US 6,619,102 B2
(45) Date of Patent: Sep. 16, 2003

(54) BEARING INCLUDING AT LEAST ONE ELASTIC DEFORMATION ZONE AND A BRAKING ASSEMLY INCLUDING SUCH A BEARING

(75) Inventors: Arnaud Salou, Annecy (FR); Christophe Nicot, Epagny (FR); Olivier Blanchin, Annecy (FR)

(73) Assignee: S.N.R. Roulements, Annecy Cedex (FR)

( * ) Notice: Subject to any disclaimer, the term of this patent is extended or adjusted under 35 U.S.C. 154(b) by 5 days.

(21) Appl. No.: 09/915,555

(22) Filed: Jul. 27, 2001

(65) Prior Publication Data

US 2002/0061148 A1 May 23, 2002

(30) Foreign Application Priority Data

Jul. 28, 2000 (FR) .............................................. 00 09991

(51) Int. Cl.⁷ .............................................. G01M 17/04
(52) U.S. Cl. ................. 73/11.07; 73/862.631; 73/862.044; 73/862.541; 384/448
(58) Field of Search ................. 384/448; 73/11.07, 73/862.631, 862.044, 862.541

(56) References Cited

U.S. PATENT DOCUMENTS

| | | | | |
|---|---|---|---|---|
| 3,771,359 A | * | 11/1973 | Shoberg | 73/862.044 |
| 4,203,319 A | * | 5/1980 | Lechler | 73/862.49 |
| 4,297,877 A | * | 11/1981 | Stahl | 73/146 |
| 5,140,849 A | * | 8/1992 | Fujita et al. | 73/593 |
| 5,186,042 A | * | 2/1993 | Miyazaki | 73/118.1 |
| 5,805,080 A | * | 9/1998 | Lemoine et al. | 340/682 |
| 5,821,434 A | * | 10/1998 | Halliday | 280/5.52 |
| 5,952,587 A | * | 9/1999 | Rhodes et al. | 73/862.541 |
| 6,038,933 A | * | 3/2000 | Meyer | 73/146 |
| 6,230,555 B1 | * | 5/2001 | Doerrie et al. | 33/609 |
| 6,295,878 B1 | * | 10/2001 | Berme | 73/862.044 |
| 6,311,541 B1 | * | 11/2001 | Miyazaki | 73/11.07 |

FOREIGN PATENT DOCUMENTS

EP 0 432 122 A2 6/1991

* cited by examiner

Primary Examiner—Jack Lavinder
Assistant Examiner—Benjamin A Pezzlo
(74) Attorney, Agent, or Firm—Nixon Peabody LLP; David S. Safran (57) ABSTRACT

A bearing of the type comprising a fixed raceway (2) intended to be associated with a fixed structure, a rotating raceway (3) intended to be associated with a rotating member (6, 8, 9) and rolling bodies disposed between them, in which the fixed raceway (2) comprises first means (5) of fixing the said bearing (1) to the fixed structure. The fixed raceway (2) comprises at least one elastic deformation zone able to be deformed under the action of forces exerted on the said bearing (1). At least one sensor (26) able to measure the said forces is functionally associated with the said elastic deformation zone.

19 Claims, 6 Drawing Sheets

BEARING INCLUDING AT LEAST ONE ELASTIC DEFORMATION ZONE AND A BRAKING ASSEMLY INCLUDING SUCH A BEARING

The invention concerns a bearing, a braking assembly comprising such a bearing, and an application of these assemblies to the measurement of the torque and the forces applied to one or each of the wheels of a vehicle and to the regulation of at least one control of the vehicle.

Bearings are already known of the type comprising a fixed raceway intended to be associated with a fixed structure, a rotating raceway intended to be associated with a rotating member, and rolling bodies disposed between them, in which the fixed raceway comprises means of fixing the bearing to a fixed structure.

When it is wished to know forces applied by the fixed structure to the rotating structure, it is known that attached parts forming measuring units can be disposed at the connection between the fixed raceway and the fixed structure.

The document EP-A-0 432 122 illustrates this technology, providing a measuring unit rigidly fixed to the fixed raceway, this measuring unit comprising an annular support and a plurality of sensors associated with the support in predetermined orientations with respect to the axis of rotation.

This type of technology has a certain number of drawbacks.

This is because the presence and multiplicity of the attached measuring units make the assembly of the bearing tricky and complex.

The fixed raceway, by trapping the measuring units when the bearing is assembled, subjects them to prestressing which is detrimental to the subsequent measurements of forces.

Moreover, when it is wished also to know the braking torque applied to a wheel by means of a brake calliper, this type of technology cannot be envisaged.

The invention therefore aims to remedy these drawbacks by proposing a bearing which comprises, in an integrated fashion, deformation zones instrumented by sensors, and which makes it possible to measure both the forces resulting from the static and dynamic behaviour of the vehicle and the braking torque exerted on a wheel of the vehicle.

For this purpose, and according to a first aspect, the invention proposes a bearing of the type comprising a fixed raceway intended to be associated with a fixed structure, a rotating raceway intended to be associated with a rotating member and rolling bodies disposed between them, in which the fixed raceway comprises first means of fixing the said bearing to the fixed structure, the fixed raceway comprising at least one elastic deformation zone able to be deformed under the action of forces exerted on the said bearing, at least one sensor able to measure the said forces being associated functionally with the said elastic deformation zone.

This bearing can also comprise second means of fixing a device intended to apply a force to the rotating member associated with the rotating raceway.

The elastic deformation zone is located for example in the vicinity of the first and/or the second fixing means.

According to one embodiment, the sensor or sensors located in the vicinity of the first fixing means are arranged so as to measure the forces applied to the first fixing means, and their respective moments, in three orthogonal directions forming a trihedron together.

The sensor or sensors located in the vicinity of the second fixing means can for their part be arranged so as to measure the forces applied to the second fixing means, and their respective moments, in three orthogonal directions forming a trihedron together.

According to one embodiment, the bearing comprises a flange forming the first fixing means, this flange projecting radially from the fixed raceway, and comprising two flat faces extending radially and connected together by a circumferential face.

This flange comprises for example first radial projections in which axial holes are formed for fixing the bearing by screwing to the fixed structure, two adjacent projections being separated by a zone with a lesser axial and/or radial direction forming an elastic deformation zone, on which the sensor or sensors are disposed.

For example, the flange comprises four first projections disposed substantially at 90° with respect to each other, defining between them four elastic deformation zones on each of which at least one sensor is disposed.

Moreover, the flange can comprise second radial projections forming second means of fixing to the bearing a device intended to apply a force to the rotating member associated with the rotating raceway, the projections comprising a base zone and an end zone.

These second projections comprise for example axial holes for fixing the said device by screwing, located in the end zone, at least one sensor being disposed on or in the vicinity of the base zone, this forming an elastic deformation zone.

According to one embodiment, two sensors are disposed on the circumferential face, on each side of each radial projection, and/or at least one sensor is disposed on the transverse faces of the flange.

Preferably, one radial dimension of the second projection is greater than a radial dimension of the first projections.

According to one embodiment, the flange comprises:
 four first projections disposed substantially at 90° with respect to each other, defining between them three elastic deformation zones on each of which at least one sensor is disposed; and
 two second projections located between two adjacent first projections, each second projection being provided with at least one sensor.

As a variant, openings are formed in the first and/or second projections, sensors being disposed on the internal faces of the openings.

According to one embodiment, at least one sensor is disposed on, or comprises, an intermediate part fixed to an elastic deformation zone by nesting, welding, gluing or the like.

According to a second aspect, the invention proposes a braking assembly comprising a bearing as described above, and a brake calliper associated with it by means of second fixing means, the calliper being separate from the fixed structure.

According to one embodiment, this assembly also comprises a brake disc associated with the rotating raceway, inserted between the jaws of the calliper so that the latter applies to it a braking force by the bringing together of the jaws.

According to a third aspect, the invention proposes an application of these assemblies to the measurement on the one hand of the braking torque of a vehicle and on the other hand of the longitudinal, transverse and vertical forces exerted on one or each of its wheels, in which an assembly is associated with one or each of the wheels of the vehicle, the torque being measured by means of sensors located in the vicinity of the second fixing means and the forces being measured by means of the sensors located in the vicinity of the first fixing means.

According to one embodiment, in which a control device collects the measurements of the braking torque and/or of the forces exerted on one or each of the wheels, this device being arranged so as to regulate at least one command for dynamic control of the vehicle, notably the braking, the acceleration, the steering or the suspension according to the said measurements.

Other objects and advantages of the invention will emerge during the following description, given with reference to the accompanying drawings, in which.

FIGS. 1 to 5 depict a bearing 1 which comprises a fixed outer raceway 2 and a rotating inner raceway 3, and rolling bodies between them (not shown in the figures).

The fixed raceway 2 is intended to be associated with a fixed structure such as the chassis of a vehicle 4 by means of first fixing means 5, whilst the rotating raceway 3 is intended to be associated with a rotating member 6.

Figure 4:
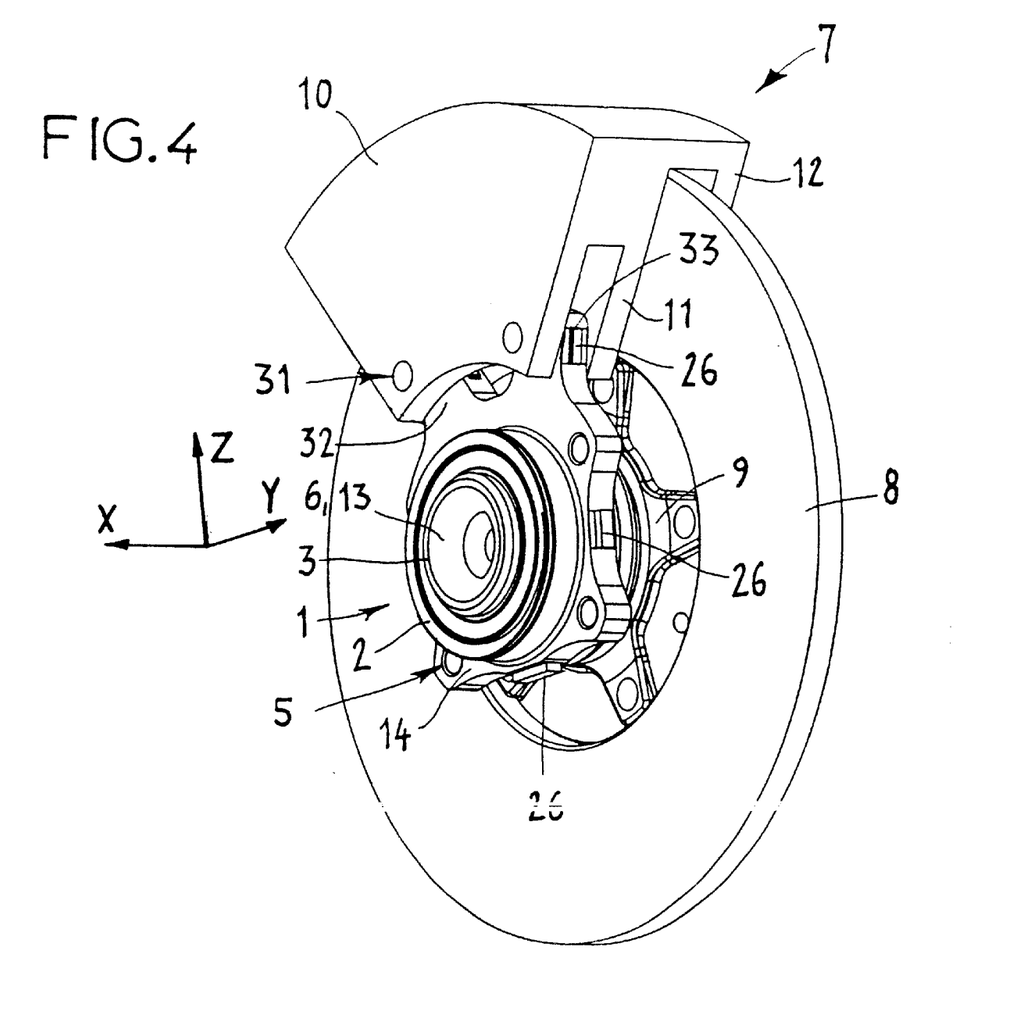
FIG. 4 is a perspective view of a braking assembly comprising a bearing like the one in FIGS. 1 and 2, a brake calliper associated with the fixed raceway and a brake disc associated with the rotating raceway.
Figure 5:
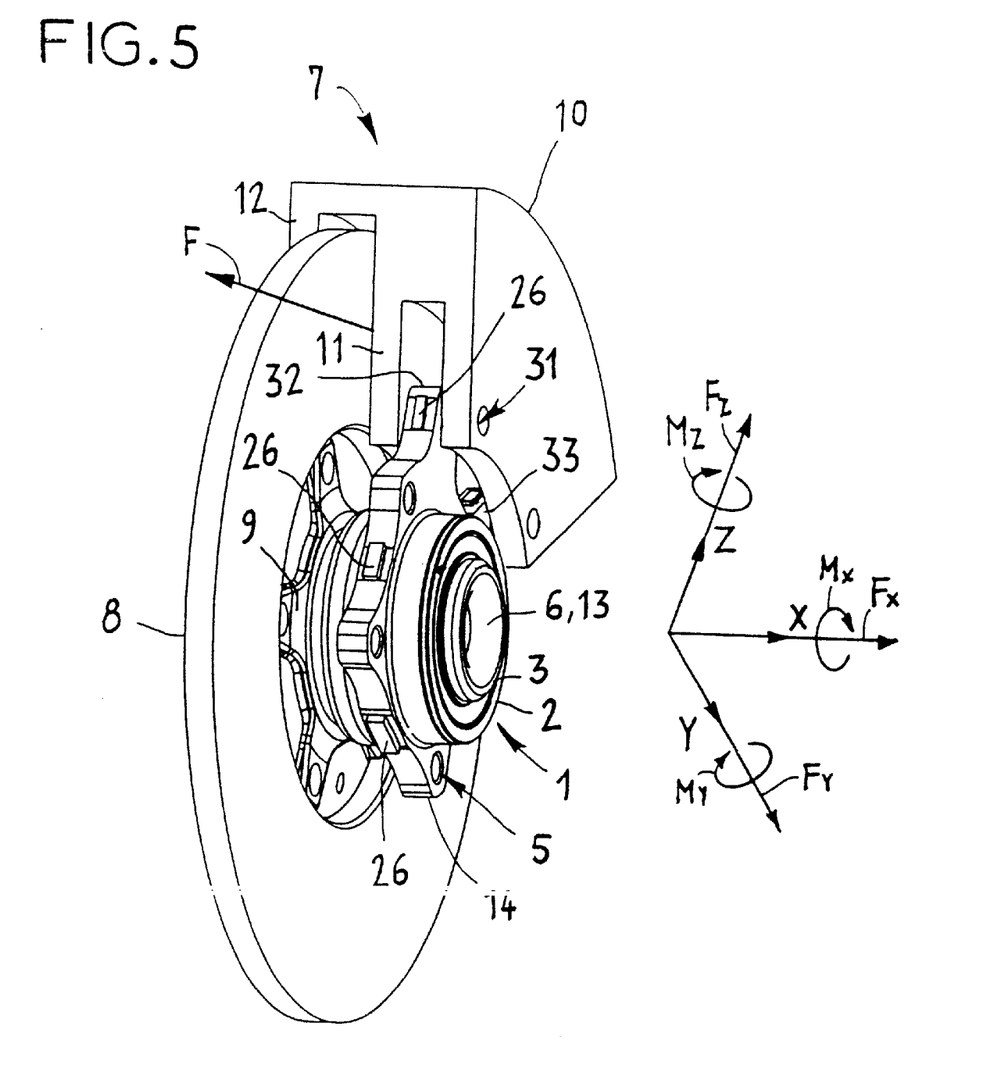
FIG. 5 is a perspective view of the braking assembly of FIG. 4, at another angle of view.

In an application illustrated in FIGS. 4 and 5, the bearing 1 is integrated in a braking assembly 7 which comprises a brake disc 8 mounted on a flange 9 of the hub 13, and a calliper 10 having two jaws 11, 12 disposed on each side of the disc 8 in order to exert a braking force F on it by gripping of the disk 8 when the jaws 11, 12 are brought together.

In a first variant depicted in the figures, the rotating raceway 3 was fitted on the hub 13, which lies coaxially to the disc 8, the disc 8 and the hub 13 forming part of the rotating member 9 mentioned above.

In a second variant (not shown), the hub 13 comprises at least one running track for the rolling bodies so as to form part of the rotating raceway 3. In this variant, the hub 13 is for example crimped onto the fixed raceway 2 and the rotating member 6 comprises the disc 8 mounted on the flange 9.

Three arbitrary directions depicted in FIGS. 1 to 5 are defined in relationship to the braking assembly 7 in order to facilitate the present description: an axial direction X, referred to as longitudinal, merged with the axis of the bearing 1, the axis of the disc 8 and the axis of the hub 13; and two radial directions perpendicular to the axial direction and perpendicular to each other: a direction Y referred to as transverse and a direction Z referred to as elevation, so that the three directions X, Y, Z form a direct trihedron in space.

It is assumed for more convenience that, in the case of the braking assembly 7, the elevation direction Z is perpendicular to the ground, whilst the longitudinal X and transverse Y directions are parallel to the ground.

A location close to the axis of the bearing 1 is said to be inner, while a location at a distance from the axis is said to be outer.

Forces are applied by the fixed structure to the first fixing means 5 or vice-versa, notably during movements (pitch, roll, yaw) of the chassis of the vehicle 4 with respect to its wheels and axles, due to acceleration, bends, movements of the suspension and braking.

These forces result in forces in the three directions X, Y, Z, and moments about axes parallel to these directions.

It is wished to measure at least some of these forces.

In order to fix the bearing 1 to the fixed structure, the fixed raceway 2 comprises a flange 14 made in one piece, extending radially to at least part of the circumference of the bearing 1.

This flange 14 has two faces 15, 16 which extend radially in a transverse elevation plane, connected by a circumferential face 17, and has in it through holes 18 for fixing the fixed raceway 2 to the fixed structure by screwing.

Being associated on the one hand with the fixed structure through its fixed raceway 2 and on the other hand with the rotating member 6 through its rotating raceway 3, the bearing 1 is subjected to and transmits the forces at least partly, and thereby constitutes a favoured measuring place.

To this end, the flange 14 has at least one elastic deformation zone 19, 20, 21 deformable under the action of forces exerted on the bearing.

The material from which the bearing 1 is produced—notably the fixed raceway 2—and the form of the deformation zones 19, 20, 21 are chosen so that the deformations do not exceed the elastic limit of the material.

According to one embodiment, the material from which the bearing is produced is a steel conventionally used in the field of bearings.

In addition, according to an embodiment illustrated in FIGS. 1 to 5, the flange 14 comprises four first radial projections 22, 23, 24, 25 in which the holes 18 are provided, and forming the first fixing means 5 mentioned above.

According to another embodiment (not shown), the flange 14 comprises three first radial projections in which holes are provided which are disposed substantially 120° from each other.

The bearing 1 is mounted on the chassis by means of screws which can either screw into the journal carrier passing through the holes 18 or screw into the holes 18 passing through the journal carrier.

The flange 14 has a thickness (that is to say the distance separating its two faces 15, 16, or the transverse dimension of its circumferential face) sufficient to both ensure rigid fixing of the bearing 1 to the fixed structure and allow a deformation of the fixed raceway 2 under the effect of the forces to which it is subjected.

According to an embodiment illustrated in FIGS. 1 to 5, the flange comprises hollow zones 19, 20, 21, whose radial and/or axial dimensions are less than the radial or respectively axial dimensions of the first projections 22, 23, 24, 25.

According to one embodiment, the first radial projections are disposed at 90° with respect to each other, just like the hollow zones 19, 20, 21, these being interposed between the first projections 22, 23, 24, 25.

These hollow zones, whose purpose is to facilitate the local deformations of the flange 14, form the deformation zones 19, 20, 21 mentioned above.

In order to make it possible to measure these deformations, and consequently the forces to which the bearing 1 is subjected, at least one sensor 26 is functionally associated with at least one and for example with each elastic deformation zone 19, 20, 21.

For example, each sensor 26 can be produced from elements chosen from amongst:
 strain gauges based on piezoresistive elements;
 acoustic surface wave sensors;
 magnetic field sensors, for example based on sensitive elements of the magnetoresistor, giant magnetoresistor, Hall effect or tunnel effect magnetoresistor type.

Figure 6:
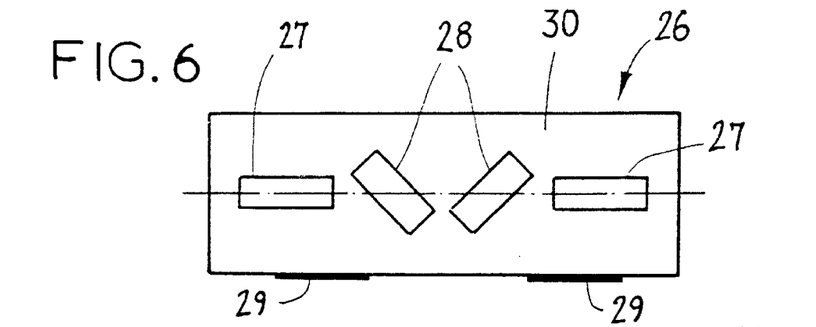
FIG. 6 is a plan view from above of a sensor with which the bearing of the previous figures is provided, according to an embodiment in which it comprises, on its top face, four strain gauges mounted in a bridge which are glued to a substrate, making it possible to measure the bending and torsion deformations undergone by the substrate.
Figure 7:
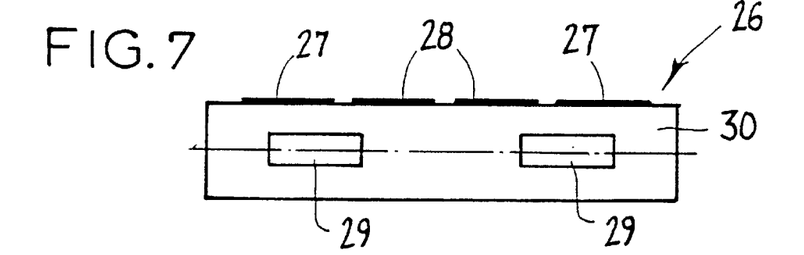
FIG. 7 is a side view of the sensor of FIG. 6, which comprises on its lateral face two strain gauge sensors for measuring other bending deformations undergone by the substrate.

According to an embodiment illustrated in FIGS. 6 and 7, which illustrate a sensor 26 in close-up, the latter is produced from strain gauges 27, 28, 29 whose ohmic value varies linearly as a function of the elongation.

The sensor 26 comprises for example a dielectric substrate forming a plate 30 on which the gauges 27, 28, 29 are glued or formed by screen printing or equivalent process.

For example, two bending gauges 27 and two torsion gauges 28 are disposed on the same top face of the plate, whilst two bending gauges 29 are disposed on the same lateral face of the plate 30.

These strain gauges have a current running through them and are inserted for example in a low-voltage Wheatstone bridge circuit, and make it possible to measure the ohmic value of each of the strain gauges.

It is possible to deduce therefrom the deformations undergone by the plate 30 under torsion on the one hand and under flexion in two perpendicular directions on the other hand.

The plate 30 being rigidly fixed to the flange on a deformation zone 19, 20, 21, for example by gluing or welding, it is possible to deduce therefrom the deformations of the deformation zone 19, 20, 21, and consequently the stresses to which it is subjected.

The sensors 26 can be disposed on the transverse faces 15, 16 of the flange 14 and/or on its circumferential face 17 in the vicinity of or on a deformation zone 19, 20, 21, the first projections 22, 23, 24, 25 being rigidly fixed to the fixed structure.

In addition, the flange 14 comprises, according to an embodiment illustrated in FIGS. 1 to 5, second means 31 of fixing the brake calliper to the flange 14.

According to variant embodiments, not shown, these second fixing means 31 associate another type of device intended to apply a force to the rotating member 6.

According to one embodiment, the flange 14 comprises at least one and for example two radial projections 32, 33 comprising through holes 34 for fixing the calliper 10 by screwing, and forming the second fixing means 31.

The second projections 32, 33 comprise, from the inside to the outside, a base zone 35 and an end zone 36 in which the holes 34 are formed.

According to an embodiment illustrated in FIGS. 1 to 5, the two second projections 32, 33 are interposed between two consecutive first projections 22, 23, so that the flange 14 has a plane of symmetry of longitudinal elevation, and the radial dimension of the second projections 32, 33 is greater than the radial dimension of the first projections 22, 23, 24, 25.

According to this embodiment, the first 22–25 and second 32, 33 projections are disposed in the same plane, but they can also be disposed in two planes, coplanar or not.

The second projections 32, 33 forming the sole support for the brake calliper 10, this being separate from the chassis of the vehicle, all the forces and the braking torque applied by the latter to the disk are transmitted to the bearing 1 by means of the second projections 32, 33.

It is wished to measure these forces, and their moments in the three directions X, Y, Z, so as to deduce therefrom notably the braking torque.

For this purpose, the second projections 32, 33 each comprise at least one elastic deformation zone on which—or in the vicinity of which—there is disposed a sensor 26 as described above, able to measure the deformation which it undergoes during braking, in the three directions X, Y, Z.

This elastic deformation zone is for example merged with the base zone 35 of the second projection 32, 33.

Figure 1:
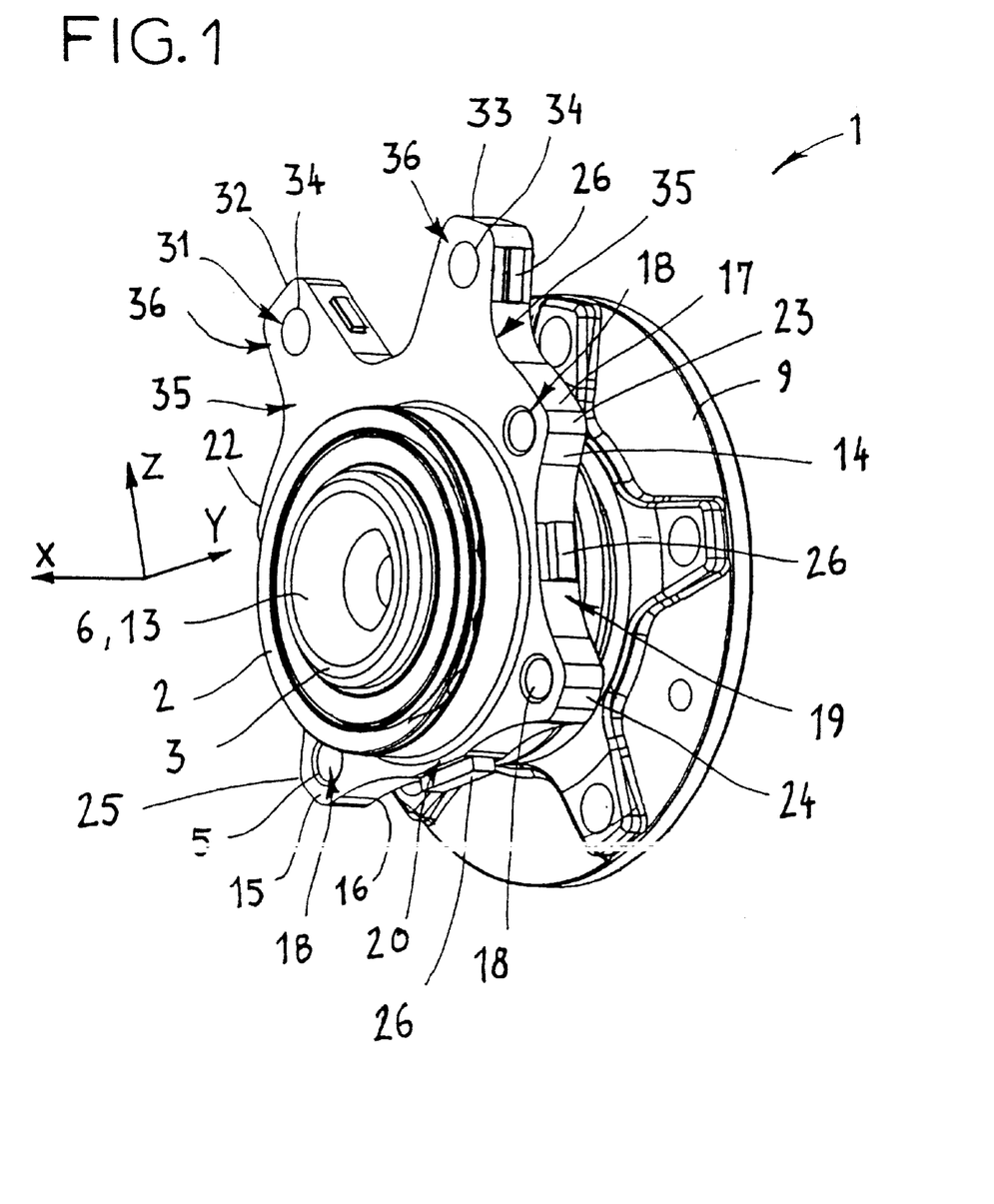
FIG. 1 is a perspective view of a bearing comprising a fixed outer raceway, a rotating inner raceway fitted on a wheel hub, where the fixed raceway comprises first means of fixing the bearing to a fixed structure; according to the embodiment illustrated, the fixed raceway comprises several elastic deformation zones able to be deformed under the action of forces exerted on the bearing, and sensors able to measure these forces are associated with these deformation zones; the hub comprising a flange with which a brake disc of a motor vehicle is intended to be associated.
Figure 2:
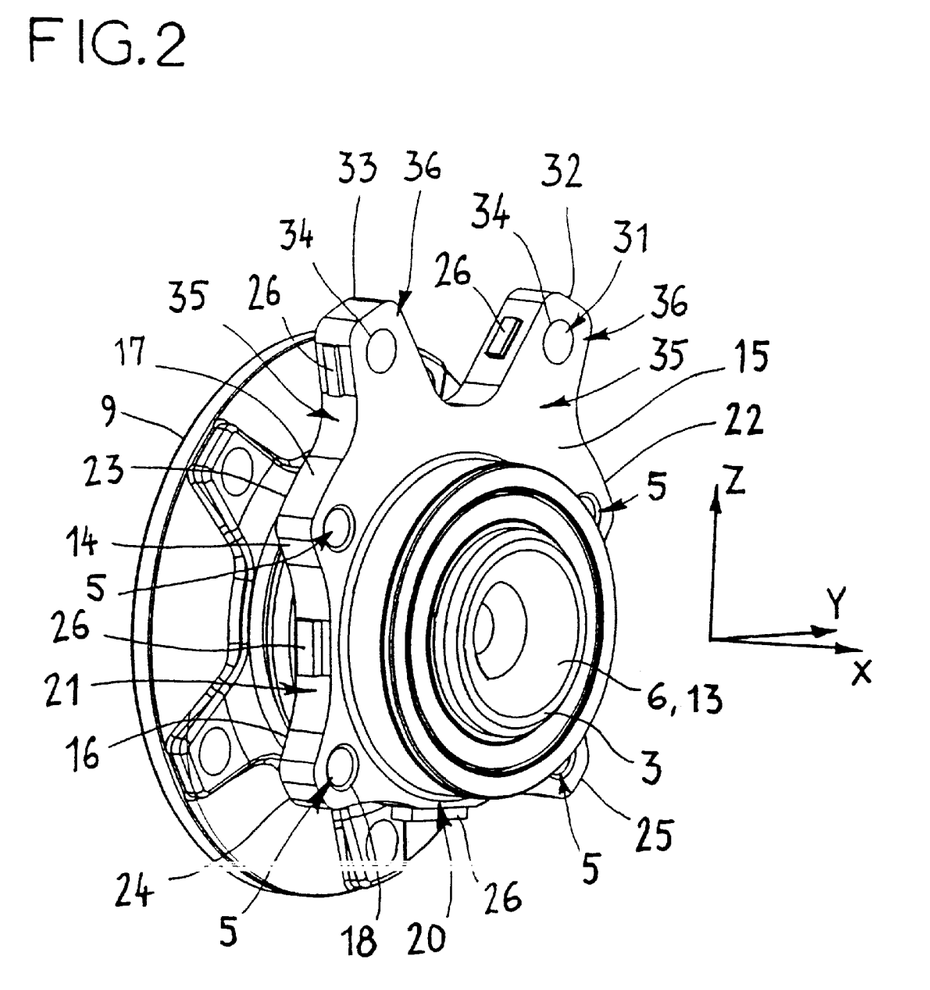
FIG. 2 is a perspective view of the bearing depicted in FIG. 1, at another angle of view.

According to one embodiment, illustrated notably in FIGS. 1 and 2, two sensors 26 are disposed on the circumferential face 17 of the flange 14, on each side and at the base of each second projection 32, 33.

A sensor 26 can be disposed at the base of each projection 32, 33, on one of the transverse faces 15, 16 of the flange 14, or on each of them.

In order to improve the precision of the measurements, it is possible to combine the arrangement of the sensors 26 on the circumferential face 17 and on the transverse faces 15, 16 of the flange 14.

Figure 3:
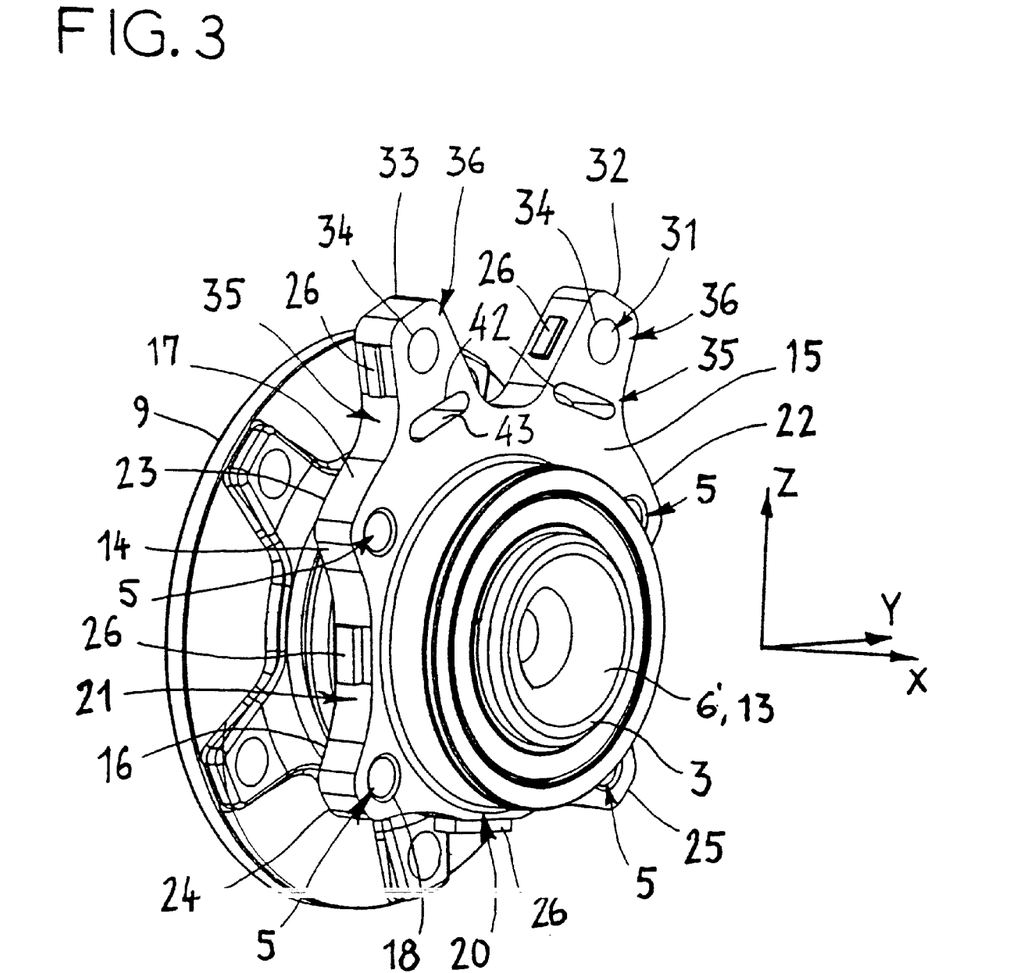
FIG. 3 is a perspective view of a bearing similar to the one in the previous figures, in which openings are formed in the vicinity of the second fixing means so as to increase the magnitude of the elastic deformations generated by the forces.

As a variant, depicted in FIG. 3, an opening 42 is formed in each base part 35 of the second projections 32, 33. These openings 42 are formed by a through oblong hole and their function is to increase the magnitude of the elastic deformations generated by the forces so as to improve the measurements.

In addition, at least one sensor 26 can be disposed on an internal face 43 of the opening 42 so as to form an instrumented deformation zone.

Figure 8:
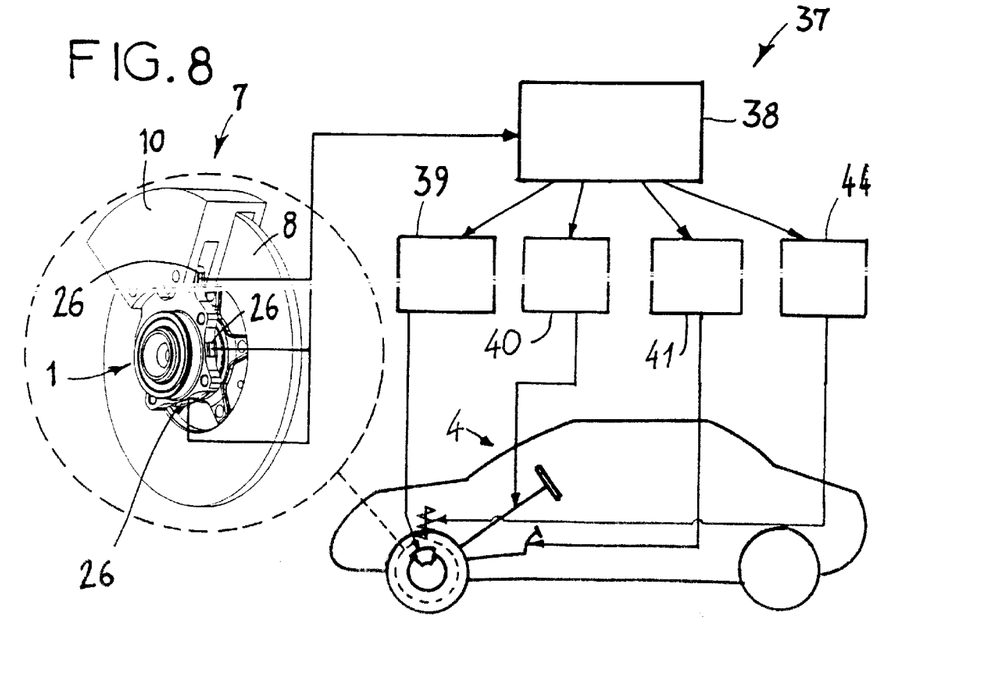
FIG. 8 is a diagram illustrating an application of FIGS. 4 and 5 together to the measurement of the vehicle braking torque; in this figure, a control device collects the measurements of the braking torque and/or the forces exerted on the wheels; this device is connected to four control units of the vehicle in order to regulate the braking, the acceleration, the steering or the suspension according to the measurements collected.

According to one embodiment illustrated in FIG. 8 the information resulting from the measurement by the sensors 26 of the deformations of the flange 14 on the one hand in the vicinity of the first means 5 of fixing the fixed raceway 2 to the fixed structure and on the other hand in the vicinity of the second means 31 of fixing the brake calliper to the fixed raceway 2 are connected by a control device 37.

This control device comprises for example a computer 38 connected to the sensors 26, which calculates the stresses to which the flange is subjected at the sensors, derives therefrom the resultants Fx, Fy, Fz of the forces to which the bearing 1 is subjected, respectively in the directions X, Y, Z, and their moments Mx, My, Mz in these directions.

In this way the computer 38 calculates notably the braking torque applied by the calliper 10 to the disc 9.

As a variant, a bearing 1 is associated with each wheel of the vehicle so that the computer 38 makes it possible to measure the braking torque and/or the forces to which each wheel is subjected.

According to one embodiment, illustrated in FIG. 8, the control device 37 also comprises four servomotors 39, 40, 41, 44 connected on the one hand to the computer 38 and on the other hand respectively to the braking system, to the steering system, to the acceleration system and to the suspension of the vehicle 4, in order to regulate respectively the braking, the steering, the acceleration and the suspension thereof according to the values of the forces Fx, Fy, Fz and the moments Mx, My, Mz calculated by the computer.

As a variant, the bearing 1 can be instrumented by means of a magnetic coder associated with the rotating raceway 3 or forming a sealing joint and a sensor associated with the fixed raceway 2 so as to measure the speed of rotation of the rotating member.

In this variant, the speed of rotation can be implemented in the control device 37 so as to be able to be used during the regulation of the controls of the vehicle 4.

What is claimed is:

1. Bearing comprising a rotating raceway provide with means for associating said raceway with a rotating member, a fixed raceway having first means for fixing the bearing to a fixed structure and at least one elastic deformation zone positioned on the surface of to fixed raceway, said at least one elastic deformation zone being able to be deformed under the action of forces exerted on the bearing, and at least one sensor from measuring said forces that is fixed on said at least one elastic deformation zones wherein the first means for fixing comprises a flange, said flange projecting radially from the fixed raceway and comprising two radially extending flat faces that are connected together by a circumferential face.

2. Bearing according to claim 1, further comprising a second means for fixing a device for applying a force to the rotating member associated with the rotating raceway.

3. Bearing according to claim 1, wherein the at least one elastic deformation zone comprises at least one elastic deformation located in the vicinity of the first means for fixing.

4. Bearing according to claim 3, wherein the at least one sensor is located in the vicinity of the first means for fixing and is arranged so as to measure forces applied to the first fixing means and respective moments thereof in three orthogonal directions which form a trihedron together.

5. Bearing according to claim 2, wherein the at least one elastic deformation zone comprises at least one elastic deformation located in the vicinity of the second means for fixing.

6. Bearing according to claim 3, wherein the at least one sensor is located in the vicinity of the second fixing means and is arranged so as to measure forces applied to the second fixing means, and respective moments thereof in three orthogonal directions which form a trihedron together.

7. Bearing according to claim 1, wherein said flange further comprises first radial projections in which axial holes are formed for fixing the bearing to the fixed structure by screws, adjacent projections being separated by a respective said defonnation zone which is of at least one of a lesser axial dimension and a lesser radial dimension.

8. Bearing according to claim 7, wherein first radial projections comprise four first projections which are disposed substantially at 90° with respect to each other and between each pair of which a respective said deformation zone is defined on which at least one sensor is disposed.

9. Bearing according to claim 7, wherein the flange further comprises second radial projections forming second means for fixing a device for applying a force to the rotating member to the bearing, the second radial projections having a base zone and an end zone.

10. Bearing according to claim 9, wherein the second radial projections have axial holes in said end zone for the fixing of the device with screws, and wherein at least one sensor is located in the vicinity of the base zone.

11. Bearing according to claim 7, wherein two sensors are disposed on the circumferential face of the flange, on each side of each of second radial projections.

12. Bearing according to claim 1, wherein the flange has transverse faces on which at least one sensor is disposed.

13. Bearing according to claim 9, wherein a radial dimension of the second projections is greater than a radial dimension of the first projections.

14. Bearing according to claim 9, wherein the flange comprises:

four of said first projections disposed substantially at 90° with respect to each other and defining four pair combinations of said four first projections, a respective elastic deformation zone on which at least one sensor is disposed being defined between three of said four pair combinations; and two of said second projections being located between a fourth of said four pair combinations, each second projection being provided with at least one sensor.

15. Bearing according to claim 9, wherein openings are formed in at least one of the first projections and the second projections.

16. Bearing according to claim 1, wherein the sensors comprise strain gauges based on piezoresistive elements.

17. Bearing according to claim 1, wherein the sensors comprise acoustic surface wave sensors.

18. Bearing according to claim 1, wherein that the sensors comprise magnetic field sensors.

19. Bearing according to claim 1, wherein at least one sensor is disposed on, or comprises, an intermediate part fixed to an elastic deformation zone by one of embedding, welding, and gluing.

* * * * *